United States Patent
Zhang et al.

(10) Patent No.: US 11,069,073 B2
(45) Date of Patent: Jul. 20, 2021

(54) ON-SHELF COMMODITY DETECTION METHOD AND SYSTEM

(71) Applicant: ADVANCED NEW TECHNOLOGIES CO., LTD., Grand Cayman (KY)

(72) Inventors: Xiaobo Zhang, Hangzhou (CN); Zhangjun Hou, Hangzhou (CN); Xudong Yang, Hangzhou (CN); Xiaodong Zeng, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/875,811

(22) Filed: May 15, 2020

(65) Prior Publication Data

US 2020/0279382 A1    Sep. 3, 2020

Related U.S. Application Data

(63) Continuation of application No. PCT/CN2020/071379, filed on Jan. 10, 2020.

(30) Foreign Application Priority Data

Jul. 23, 2019  (CN) .......................... 201910665552.7

(51) Int. Cl.
*G06T 7/292* (2017.01)
*G06T 7/70* (2017.01)
(Continued)

(52) U.S. Cl.
CPC .......... *G06T 7/292* (2017.01); *G06K 9/00355* (2013.01); *G06Q 10/087* (2013.01);
(Continued)

(58) Field of Classification Search
CPC .. G06T 7/292; G06T 5/50; G06T 7/70; G06T 2207/10028; G06Q 10/087; G06K 9/00355
See application file for complete search history.

(56) References Cited

U.S. PATENT DOCUMENTS 7,693,757 B2    4/2010  Zimmerman
8,091,782 B2    1/2012  Cato et al.
(Continued)

FOREIGN PATENT DOCUMENTS

CN    108460933 A    8/2018
CN    108898104 A    11/2018
(Continued)

OTHER PUBLICATIONS

First Search dated Jun. 16, 2020, issued in related Chinese Application No. 201910665552.7 (2 pages).
(Continued)

*Primary Examiner* — Yon J Couso

(57) ABSTRACT

Methods, systems, and apparatus, including computer programs encoded on computer storage media, for on-shelf merchandise detection are provided. One of the methods includes: obtaining a plurality of depth images associated with a shelf from a first camera; obtaining a plurality of images from one or more second cameras associated with each of a plurality of tiers of the shelf; detecting motions of a user's hand comprising reaching into and moving away from the shelf; determining one of the tiers of the shelf associated with the detected motions, a first point of time associated with reaching into the shelf, and a second point of time associated with moving away from the shelf; identifying a first image captured before the first point in time and a second image captured after the second point in time;
(Continued)

---

Detect a position and motion state of a user's hand relative to the shelf according to the depth image; and when it is detected that the user's hand reaching into or moves away from the shelf, determine a tier the user's hand reaching into or moves way from, a first point in time of reaching into the tier, and a second point in time of moving away from the tier — 110

Query for a first image of merchandise on the tier captured by a regular camera corresponding to the tier before the first time and a second image of merchandise on the tier captured by the same after the second time — 120

Compare the first image with the second image to detect a change in merchandise on the tier — 130 and comparing the first image and the second image to determine one or more changes to merchandise.

20 Claims, 2 Drawing Sheets

(51) Int. Cl.
    *G06Q 10/08*     (2012.01)
    *G06K 9/00*     (2006.01)
    *G06T 5/50*     (2006.01)

(52) U.S. Cl.
    CPC .............. *G06T 5/50* (2013.01); *G06T 7/70* (2017.01); *G06T 2207/10028* (2013.01)

(56) References Cited

U.S. PATENT DOCUMENTS

| | | | |
|---|---|---|---|
| 8,140,185 B2 | 3/2012 | Simmons et al. | |
| 8,468,066 B2 | 6/2013 | Goldberg et al. | |
| 9,122,999 B2 | 9/2015 | Jackson et al. | |
| 9,367,770 B2 | 6/2016 | Footen | |
| 9,367,831 B1 | 6/2016 | Besehanic | |
| 9,827,683 B1 | 11/2017 | Hance et al. | |
| 9,996,818 B1 | 6/2018 | Ren et al. | |
| 10,071,856 B2 | 9/2018 | Hance et al. | |
| 10,127,438 B1 | 11/2018 | Fisher et al. | |
| 10,347,066 B2 | 7/2019 | Phillips et al. | |
| 10,515,337 B1* | 12/2019 | Niranjayan | G06Q 10/087 |
| 10,614,514 B2 | 4/2020 | Glaser et al. | |
| 10,699,421 B1* | 6/2020 | Cherevatsky | H04N 7/181 |
| 2001/0021274 A1 | 9/2001 | Lee | |
| 2013/0235206 A1 | 9/2013 | Smith et al. | |
| 2015/0262116 A1 | 9/2015 | Katircioglu et al. | |
| 2015/0310601 A1 | 10/2015 | Rodriguez et al. | |
| 2015/0326795 A1 | 11/2015 | Bashkin | |
| 2015/0339826 A1* | 11/2015 | Buibas | G06K 9/00355 382/106 |
| 2016/0034244 A1* | 2/2016 | Howard | G06Q 30/0601 345/156 |
| 2016/0034988 A1 | 2/2016 | Howard et al. | |
| 2016/0297611 A1 | 10/2016 | Williams et al. | |
| 2017/0286773 A1 | 10/2017 | Skaff et al. | |
| 2018/0005176 A1 | 1/2018 | Williams et al. | |
| 2018/0108120 A1* | 4/2018 | Venable | G06T 7/0004 |
| 2018/0108195 A1 | 4/2018 | Bashkin | |
| 2020/0111053 A1* | 4/2020 | Bogolea | G06K 9/2018 |
| 2020/0134828 A1* | 4/2020 | Diankov | G06Q 10/087 |

FOREIGN PATENT DOCUMENTS

| | | |
|---|---|---|
| CN | 108985199 A | 12/2018 |
| CN | 109446883 A | 3/2019 |
| CN | 208752722 A | 4/2019 |
| CN | 208752722 U | 4/2019 |
| CN | 109961101 A | 7/2019 |
| CN | 110472515 A | 11/2019 |

OTHER PUBLICATIONS

First Office Action dated Jun. 29, 2020, issued in related Chinese Application No. 201910665552.7, with English machine translation (10 pages).

Written Opinion and International Search Report for PCT Application No. PCT/CN2020/071379 made available to public dated Jan. 28, 2021.

Supplementary Search for Chinese Application No. 201910665552.7 dated Feb. 25, 2021.

* cited by examiner

ON-SHELF COMMODITY DETECTION METHOD AND SYSTEM

CROSS-REFERENCE TO RELATED APPLICATIONS

This application is a continuation application of International Patent Application No. PCT/CN2020/071379, filed with the China National Intellectual Property Administration (CNIPA) of People's Republic of China on Jan. 10, 2020, which is based on and claims priority to and benefit of Chinese Patent Application No. 201910665552.7, filed with the CNIPA on Jul. 23, 2019. The entire contents of all of the above-identified applications are incorporated herein by reference.

TECHNICAL FIELD

The specification relates to the computer field, and in particular, to on-shelf merchandise detection methods and systems.

BACKGROUND

In shopping scenarios such as supermarkets, a merchandise purchasing status of a user needs to be detected so as to determine whether the user picks out a merchandise from a certain shelf or tier and determine a quantity of the picked merchandise.

Therefore, it is desired to rapidly and accurately detect change information of merchandise on the shelf or tier without consuming excessive system resources.

SUMMARY

The specification provides an on-shelf merchandise detection method and system which can precisely and effectively determine change information of merchandise and consumes relatively little system resources.

The specification discloses an on-shelf merchandise detection method, wherein at least one depth camera is disposed above a shelf to capture depth images from an opening side of the shelf; the shelf has at least two tiers, and at least one regular camera is disposed on each tier to capture images of all merchandise on the tier; and the method comprises:

detecting a position and motion state of a user's hand relative to the shelf according to the depth image, and when it is detected that the user's hand reaches into or moves away from the shelf, determining a tier the user's hand reaching into or moving away from, a first point in time of reaching into the tier, and a second point in time of moving away from the tier;

querying for a first image of merchandise on the tier captured by a regular camera corresponding to the tier before the first point in time and a second image of merchandise on the tier captured by the same after the second point in time; and comparing the first image with the second image to detect one or more changes to merchandise on the tier.

In an example, the one or more changes to merchandise on the tier refers to a type of the changed merchandise and a corresponding change in the quantity of the merchandise.

In an example, the regular camera is a wide-angle camera or a fisheye camera.

In an example, a plurality of regular cameras are disposed on each tier, and images captured by the regular cameras are combined, so as to cover positions of all merchandise on the entire tier.

In an example, before the step of detecting a position and motion state of a user's hand relative to the shelf according to the depth image, the method further comprises: associating each pixel of the depth image captured by the depth camera with a corresponding tier.

In an example, the step of comparing the first image with the second image to detect one or more changes to merchandise on the tier further comprises: separately identifying merchandise in the first image and the second image to obtain a first merchandise information set corresponding to the first image and a second merchandise information set corresponding to the second image; and then determining one or more changes to merchandise on the tier based on a difference between the first merchandise information set and the second merchandise information set.

In an example, the method further comprises:
capturing, by the depth camera, a third image of the user's hand after the second point in time, identifying a merchandise in the user's hand in the third image, and determining whether an identification result is consistent with a detection result obtained from the step of comparing the first image with the second image to detect one or more changes to merchandise on the tier.

The specification further discloses an on-shelf merchandise detection system, comprising:

at least one depth camera disposed above a shelf, configured to capture depth images from an opening side of the shelf;

at least one regular camera disposed on each tier, configured to capture images of all merchandise on the tier;

a detection module, configured to detect a position and motion state of a user's hand relative to the shelf according to the depth image, and when it is detected that the user's hand reaches into or moves away from the shelf, determine a tier the user's hand reaching into or moving away from, a first point in time of reaching into the tier, and a second point in time of moving away from the tier;

a querying module, configured to query for a first image of merchandise on the tier captured by a regular camera corresponding to the tier before the first point in time and a second image of merchandise on the tier captured by the same after the second point in time; and a comparison module, configured to compare the first image with the second image to detect one or more changes to merchandise on the shelf.

The specification further discloses an on-shelf merchandise detection device, comprising:

a memory, configured to store a computer-executable instruction; and a processor, configured to implement the steps of the above-described method when executing the computer-executable instruction.

The specification further discloses a computer-readable storage medium, wherein the computer-readable storage medium stores therein a computer-executable instruction which, when executed by a processor, implements the method steps of the above-described method.

In the embodiments of the specification, each pixel of a depth video image is associated with a tier position; after a tier that a user's hand reaches into or moves away from is determined, a first image captured by a regular camera corresponding to the tier before the user's hand reaches into and a second image captured by the same after the user's hand moves away from are queried; and the first image and the second image are compared to detect one or more changes to merchandise on the tier, thereby accurately and efficiently detecting shelf merchandise information and using relatively little system resources.

According to some embodiments, a method for on-shelf merchandise detection comprises: obtaining a plurality of depth images associated with a shelf from a first camera; obtaining a plurality of images from one or more second cameras associated with each of a plurality of tiers of the shelf, each of the tiers of the shelf holding merchandise; detecting, based on one or more of the depth images, motions of a user's hand comprising reaching into and moving away from the shelf; determining, based on the one or more of the depth images in response to the detecting, one of the tiers of the shelf associated with the detected motions, a first point of time associated with reaching into the shelf, and a second point of time associated with moving away from the shelf; identifying, from the images obtained from the one or more second cameras associated with the determined tier, a first image captured before the first point in time and a second image captured after the second point in time; and comparing the first image and the second image to determine one or more changes to merchandise on the determined tier of the shelf.

In some embodiments, the one or more changes to the merchandise on the determined tier of the shelf comprises: a change in quantity of a type of the merchandise on the determined tier.

In some embodiments, the one or more second cameras comprise: one or more wide-angle cameras; or one or more fisheye cameras.

In some embodiments, the one or more second cameras associated with at least one of the tiers of the shelf comprise at least two cameras. The obtaining a plurality of images from the one or more second cameras associated with the tiers comprises: receiving a plurality of images from each of the at least two cameras; and combining the received images from the at least two cameras to obtain a plurality of images that cover positions of all merchandise on the at least one of the tiers.

In some embodiments, the method further comprises, before the detecting motions of a user's hand: associating each pixel of the depth images with one of the tiers of the shelf.

In some embodiments, the comparing the first image and the second image to determine one or more changes to merchandise on the determined tier of the shelf comprises: determining a first merchandise information set based on the first image; determining a second merchandise information set based on the second image; and determining the one or more changes to the merchandise on the determined tier of the shelf based on a difference between the first merchandise information set and the second merchandise information set.

In some embodiments, the obtained depth images comprise a third image showing the user's hand and captured after the second point in time. The method further comprises: identifying merchandise in the user's hand based on the third image; and determining whether the identified merchandise is consistent with the determined one or more changes to the merchandise on the determined tier of the shelf.

According to other embodiments, a system for on-shelf merchandise detection comprises a processor and a non-transitory computer-readable storage medium storing instructions executable by the processor to cause the system to perform operations. The operations comprise: obtaining a plurality of depth images associated with a shelf from a first camera; obtaining a plurality of images from one or more second cameras associated with each of a plurality of tiers of the shelf, each of the tiers of the shelf holding merchandise; detecting, based on one or more of the depth images, motions of a user's hand comprising reaching into and moving away from the shelf; determining, based on the one or more of the depth images in response to the detecting, one of the tiers of the shelf associated with the detected motions, a first point of time associated with reaching into the shelf, and a second point of time associated with moving away from the shelf; identifying, from the images obtained from the one or more second cameras associated with the determined tier, a first image captured before the first point in time and a second image captured after the second point in time; and comparing the first image and the second image to determine one or more changes to merchandise on the determined tier of the shelf.

According to yet other embodiments, a non-transitory computer-readable storage medium for on-shelf merchandise detection is configured with instructions executable by one or more processors to cause the one or more processors to perform operations. The operations comprise: obtaining a plurality of depth images associated with a shelf from a first camera; obtaining a plurality of images from one or more second cameras associated with each of a plurality of tiers of the shelf, each of the tiers of the shelf holding merchandise; detecting, based on one or more of the depth images, motions of a user's hand comprising reaching into and moving away from the shelf; determining, based on the one or more of the depth images in response to the detecting, one of the tiers of the shelf associated with the detected motions, a first point of time associated with reaching into the shelf, and a second point of time associated with moving away from the shelf; identifying, from the images obtained from the one or more second cameras associated with the determined tier, a first image captured before the first point in time and a second image captured after the second point in time; and comparing the first image and the second image to determine one or more changes to merchandise on the determined tier of the shelf.

The specification records a lot of technical features distributed in the technical solutions. If all possible combinations (namely technical solutions) of the technical features of the specification are listed, the specification would be verbose. To avoid this issue, the technical features disclosed in the above-described summary, those disclosed in the following embodiments and examples, and those disclosed in the accompanying drawings can be freely combined to formulate various new technical solutions (all such technical solutions shall be considered having been recited in the specification), unless such combinations of technical features are technically infeasible. For example, features A+B+C are disclosed in an example, and features A+B+D+E are disclosed in another example. Features C and D are equivalent technical means having the same function and selecting one therefrom would suffice, i.e., features C and D cannot be used at the same time; and the feature E can be technically combined with the feature C. Therefore, a solution of A+B+C+D should not be considered as having been recited because such a combination is technically infeasible; a solution of A+B+C+E, on the other hand, should be considered as having been recited.

DETAILED DESCRIPTION

The following descriptions provide many technical details to help readers better understand the specification. However, those skilled in the art can understand that even without these technical details, the technical solutions claimed by the specification can still be achieved based on various variations and modifications of the following embodiments.

The embodiments of the specification will be further described in detail with reference to the accompanying drawings.

A first embodiment of the specification relates to an on-shelf merchandise detection method, wherein at least one depth camera is disposed above a shelf; and the depth camera is configured to capture depth images from an opening side of the shelf. The shelf has at least two tiers. At least one regular camera is disposed on each tier, and the regular camera is configured to capture images of all merchandise on the tier. The depth camera can capture images carrying depth information and certainly can also capture common images (such as RGB images). There are three mainstream technical routes for the depth camera to capture images carrying depth information: monocular structured light, TOF (time of flight), and binocular vision. A principle of TOF is as follows: modulated near-infrared light emitted by a sensor is reflected after striking an object, and a distance to the captured object is calculated by converting a time difference or phase difference between light transmission and reflection. A structured light technology is more complex. With the technology, an encoded optical grating, linear light source, or the like is projected onto a measured object, and three-dimensional information of the measured object is obtained through demodulation based on distortion generated therefrom. For binocular vision, two regular cameras are used, like human eyes, and a distance to a measured object is calculated according to parallax. A regular camera is a camera used to capture common images (such as RGB images).

Figure 1:
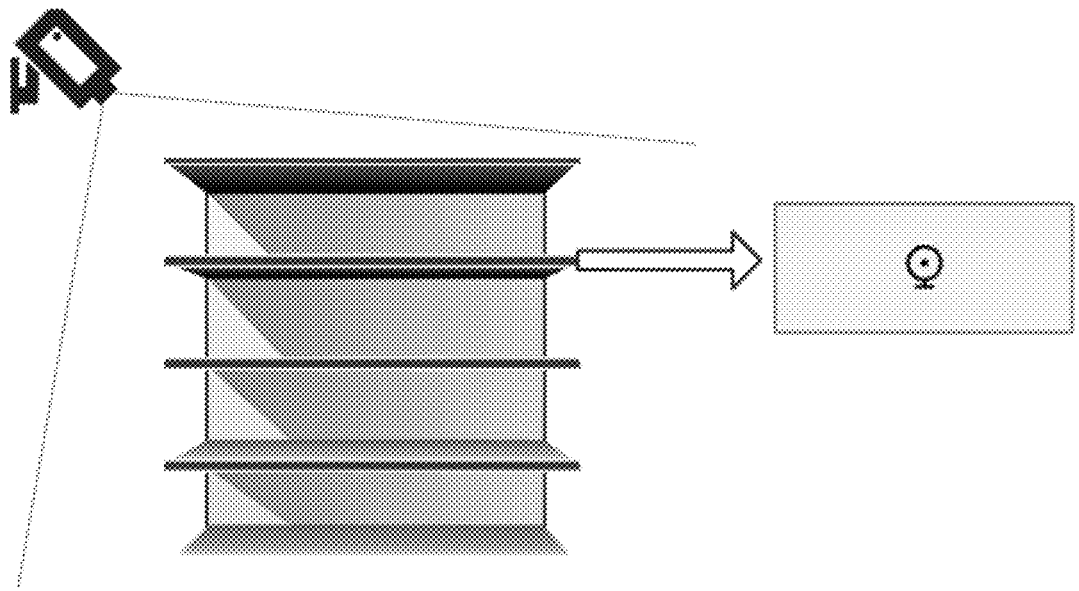
FIG. 1 shows a schematic diagram of a shelf according to a first embodiment of the specification.

For example, as shown in FIG. 1, in the embodiment, one depth camera is disposed at a periphery of an entire shelf to capture images from top to bottom. All spaces (for example, a side of the shelf that opens outwards) in which a user's hand reaches into or moves away from the shelf can be photographed by the depth camera.

The shelf has several tiers, for example, two tiers, three tiers, or more tiers. The shelf in FIG. 1 has four tiers. The shelf is tiered using several partition plates; and the floor of an upper tier is the ceiling of a lower tier. One or a plurality of regular cameras are disposed on each tier of the shelf (or referred to as "tier").

In addition, the regular camera or regular cameras are disposed on the inner top of each tier of the shelf, and a photographing range of the regular camera or regular cameras can cover positions of all merchandise on the tier of the shelf.

Optionally, in one embodiment, one wide-angle regular camera, such as a wide-angle camera with a shooting angle of 160 degrees or a fisheye camera, is used on each tier of the shelf.

Optionally, in another embodiment, a plurality of regular cameras may be alternatively disposed on each tier of the shelf; and images captured by these regular cameras are combined, so as to cover positions of all merchandise on the entire tier.

In the embodiment of the specification, each pixel of the depth image captured by the depth camera is associated with a corresponding tier. Each tier is also provided with a regular camera. Therefore, association with the regular camera on the tier is further established as well.

For example, after the depth camera is installed, a top position of the shelf needs to be manually demarcated. A partition plate of each tier can be seen in a photo captured by the depth camera. Therefore, depth information of the top position of the shelf in a depth video image is demarcated, and then depth information of each tier in the depth video image can be automatically demarcated based on a position of the partition plate of each tier. A regular camera is further pre-installed on each tier. Therefore, depth information of the user's hand captured by the depth camera can be associated with a regular camera on a tier corresponding to the depth information.

Figure 2:
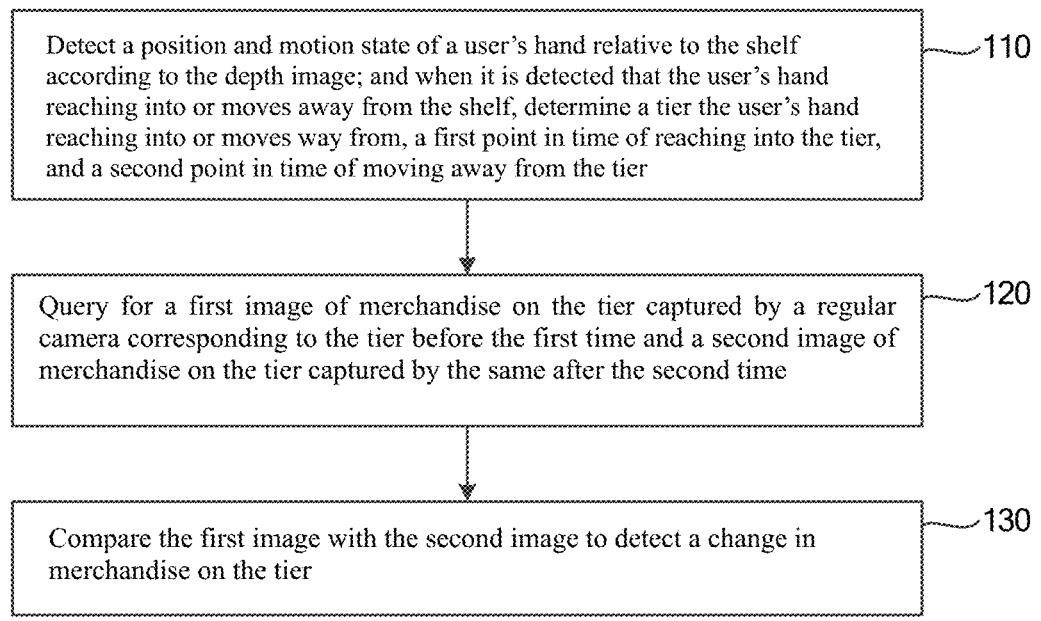
FIG. 2 shows a schematic flow chart of an on-shelf merchandise detection method according to the first embodiment of the specification.
Figure 3:
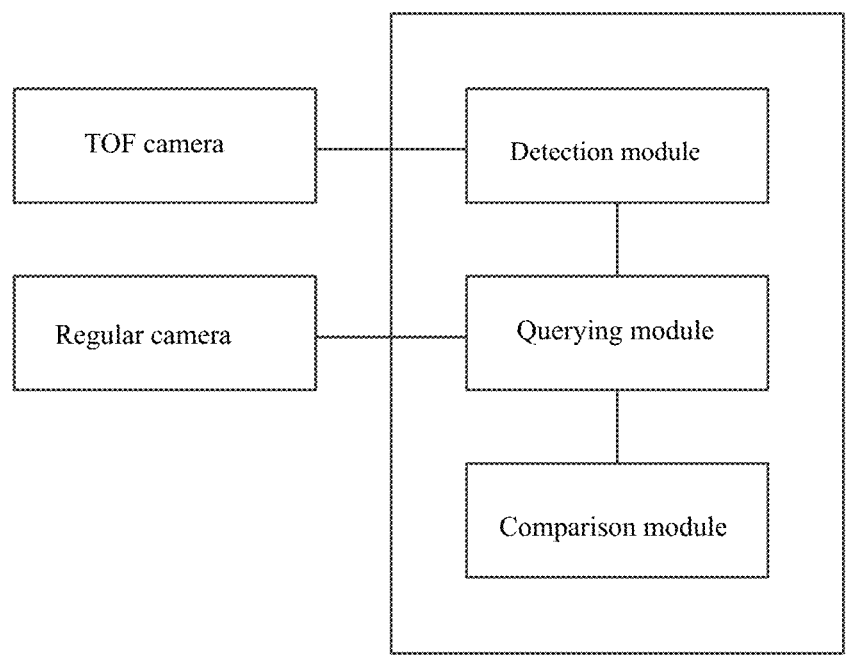
FIG. 3 shows a schematic structural diagram of an on-shelf merchandise detection system according to a second embodiment of the specification.

Further, as shown in FIG. 2, the on-shelf merchandise detection method according to the embodiment may be performed by a computing device. The computing device may obtain a plurality of depth images associated with a shelf from a depth camera and obtain a plurality of images from one or more regular cameras associated with each of a plurality of tiers of the shelf. Each tier of the shelf may hold merchandise. The computing device may perform also the following steps of the method.

Step 110: detecting a position and motion state of a user's hand relative to the shelf according to the depth image; and when it is detected that the user's hand reaches into or moves away from the shelf, determining a tier the user's hand reaching into or moving away from, a first point in time of reaching into the tier, and a second point in time of moving away from the tier;

Step 120: querying for a first image of merchandise on the tier captured by a regular camera corresponding to the tier before the first point in time and a second image of merchandise on the tier captured by the same after the second point in time; and Step 130: comparing the first image with the second image to detect one or more changes to merchandise on the tier.

The steps are explained and described in detail below.

In the step 110:

detecting a position and motion state of a user's hand relative to the shelf is done based on a video stream of the depth camera; the position of the user's hand is determined by detecting a position of a foreground moving object, and a front-end position of the user's hand is obtained using an image identification method, and interference from clothes and the like is removed. Currently, moving foreground detection methods mainly include background modeling, frame differentiation, and optical flow methods. In the embodiment, the position and motion of the user's hand relative to the shelf may be detected using an automatic background modeling method. This method is more suitable in a scenario of the embodiment.

For example, a process of the above-described background modeling may be implemented using a depth video image. When a user enters a camera range area, the user is considered as a moving foreground, and the user's hand in the moving foreground is detected to obtain an image of the user's hand area, thereby determining a hand front-end position of the user. Then whether the user's hand reaches into the shelf and which tier of the shelf the user's hand reaches into are determined by comparing the hand front-end position of the user with a semi-automatically demarcated shelf area. In addition, whether the user's hand reaches into or moves away from the shelf is determined based on an action sequence; and a first point in time of reaching into the tier and a second point in time of moving away from the tier are recorded.

In the step 120:

Based on the determined tier of the shelf that the user's hand reaches into, a regular camera corresponding to the tier can be queried; a first image of merchandise on the tier captured by the regular camera before the first point in time at which the user's hand reaches into the tier is queried, and a second image of merchandise on the tier captured by the regular camera after the second point in time at which the user's hand moves away from the tier is also queried.

In the step 130:

A change in merchandise on the shelf or tier is information of a merchandise whose quantity on the shelf or the tier is changed, i.e., a type of the merchandise on which a change occurs and a change in the corresponding quantity of the merchandise; for example, a quantity of canned cola, a quantity of canned Sprite, and a quantity of canned Mirinda are changed and the merchandise quantities are changed. For example, 1 cola can, 2 Sprite cans, and 3 Mirinda cans are taken away.

Optionally, in one embodiment, the first image and the second image may be first compared to obtain a different portion therebetween. Then merchandise identification is performed on the different portion to obtain one or more changes to merchandise on the tier.

Optionally, in another embodiment, merchandise in the first image and the second image may be separately identified to obtain two merchandise information sets corresponding to the first image and the second image; and then one or more changes to merchandise on the shelf is determined based on a difference between the two merchandise information sets. For example, it is determined through identification that the merchandise information set corresponding to the first image is 10 cola cans, 10 Sprite cans, and 10 Mirinda cans, and that the merchandise information set corresponding to the second image is 9 cola cans, 8 Sprite cans, and 7 Mirinda cans. According to a difference between the two merchandise information sets, the change in merchandise on the tier is that 1 cola can, 2 Sprite cans, and 3 Mirinda cans are taken away.

Optionally, in one embodiment, after the second point in time, the depth camera further captures a common image of the user's hand, i.e., a third image; and a merchandise in the user's hand is identified based on the third image. The third image may be among the plurality of depth images obtained from the depth camera. The identification result is used as a subsidiary basis for a detection result of one or more changes to merchandise obtained by comparing the first image with the second image, to determine whether merchandise information in the identification result can match the detection result of the change in merchandise obtained by comparing the images.

For example, one or more changes to merchandise on the shelf can be obtained based on a difference between the first image and the second image. If a credibility of the change in merchandise exceeds a preset threshold, the change in merchandise can be directly admitted. Conversely, if the credibility of the change in merchandise does not exceed the preset threshold, second verification may be performed by combining a result of identifying merchandise in the third image. The credibility is set based on the change in merchandise detected by comparing the first image and the second image and by introducing the third image as a subsidiary basis because the merchandise on the shelf may block one another and some merchandise cannot be seen completely, resulting in an inaccurate detection result.

It should be noted that the embodiments of the specification relate to pattern recognition technologies. For example, the user's hand, the merchandise in the user's hand, namely a merchandise held in the user's hand, merchandise on a tier of the shelf, etc. are recognized. In the embodiments of the specification, all these recognition operations may be implemented using a deep convolutional neural network, which is a current technology. In an application scenario of the specification, a large quantity of images need to be captured for demarcation. A demarcated image is used as a sample and inputted into the deep convolutional neural network for training. The trained deep convolutional neural network can be used to recognize a specific object, such as a user's hand or a merchandise.

An advantage of the above-described embodiment is that the computation amount during image analysis is relatively small when the depth camera is used to detect the user's hand. Although the regular camera on each tier of the shelf is constantly in a photographing state, images captured by these cameras do not require real-time processing. Further, one depth camera is sufficient to cover all tiers of the entire shelf so that the overall amount of computation during image analysis is relatively small.

A second embodiment of the specification relates to an on-shelf merchandise detection system, comprising:

at least one depth camera disposed above a shelf, configured to capture depth images from an opening side of the shelf;

at least one regular camera disposed on each tier, configured to capture images of all merchandise on the tier;

a detection module, configured to detect a position and motion state of a user's hand relative to the shelf according to the depth image; and when it is detected that the user's hand reaches into or moves away from the shelf, determine a tier the user's hand reaching into or moving away from, a first point in time of reaching into the tier, and a second point in time of moving away from the tier;

a querying module, configured to query for a first image of merchandise on the tier captured by a regular camera corresponding to the tier before the first point in time and a second image of merchandise on the tier captured by the same after the second point in time; and a comparison module, configured to compare the first image with the second image to detect one or more changes to merchandise on the shelf.

The first embodiment is a method embodiment corresponding to this embodiment.

Technical details in the first embodiment are applicable to this embodiment, and technical details in this embodiment are also applicable to the first embodiment.

It should be noted that those skilled in the art should understand that the functions implemented by the modules shown in the above-described embodiment of the on-shelf merchandise detection system can be understood with reference to related descriptions of the foregoing on-shelf merchandise detection method. The functions of the modules shown in the above-described embodiment of the on-shelf merchandise detection system may be implemented by a program (an executable instruction) that runs on a processor, or may be implemented by a logic circuit. If the above-described on-shelf merchandise detection system according to the embodiment of the specification is implemented in a form of a software function module and sold or used as an independent product, the system may be stored on a computer-accessible storage medium. Based on such an understanding, the technical solutions of the embodiments of the specification essentially or the part contributing to the current technologies may be implemented in a form of a software product. The computer software product is stored on a storage medium, and includes several instructions for instructing a computer device (which may be a personal computer, a server, a network device, or the like) to perform the entirety or a part of the method described in the embodiments of the specification. The foregoing storage medium includes any medium that can store program codes, such as a USB flash drive, a removable hard disk, a read-only memory (ROM, Read Only Memory), a magnetic disk, or an optical disc. Therefore, the embodiments of the specification are not limited to any particular combination of hardware and software.

Correspondingly, an embodiment of the specification further provides a computer-readable storage medium, wherein the computer-readable storage medium stores therein a computer-executable instruction which, when executed by a processor, implements various method embodiments of the specification. The computer-readable storage medium includes non-volatile and volatile, and removable and non-removable media, and can store information by any method or technology. The information may be a computer-readable instruction, a data structure, a program module, or other data. Examples of the computer storage medium include, but are not limited to, a phase-change random access memory (PRAM), a static random access memory (SRAM), a dynamic random access memory (DRAM), other types of random access memories (RAM), a read-only memory (ROM), an electrically-erasable programmable read-only memory (EEPROM), a flash memory or other memory technologies, a compact disk read-only memory (CD-ROM), a digital video disk (DVD) or other optical memories, a cassette type magnetic tape, a magnetic tape, a magnetic disk memory or other magnetic storage devices, or any other non-transmission medium. The computer storage medium can be configured to store information which can be accessed by a computing device. According to the definition of the specification, the computer-readable medium does not include a transitory media, such as a modulated data signal or a carrier.

Moreover, an embodiment of the specification further provides an on-shelf merchandise detection device, comprising: a memory, configured to store a computer-executable instruction; and a processor, configured to implement the steps in the above-described method embodiments when executing the computer-executable instruction in the memory.

In one embodiment, the computer-executable instruction may be used to:

detect a position and motion state of a user's hand relative to the shelf according to the depth image captured by the depth camera; and when it is detected that the user's hand reaches into or moves away from the shelf, determine a tier the user's hand reaching into or moving away from, a first point in time of reaching into the tier, and a second point in time of moving away from the tier;

query for a first image of merchandise on the tier captured by a regular camera corresponding to the tier before the first point in time and a second image of merchandise on the tier captured by the same after the second point in time; and compare the first image with the second image to detect one or more changes to merchandise on the tier.

In one embodiment, the processor may be a central processing unit ("CPU" for short), or may be another general purpose processor, a digital signal processor ("DSP" for short), an application-specific integrated circuit ("ASIC" for short), or the like. The foregoing memory may be a read-only memory ("ROM" for short), a random access memory ("RAM" for short), a flash memory ("Flash" for short), a hard disk, a solid state disk, or the like. Steps of the method disclosed in the embodiments of the specification may be directly embodied as being executed and completed by a hardware processor or executed and completed by a combination of hardware and software modules in a processor.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

It should be noted that in this specification, relational terms such as first and second are only used to differentiate an entity or operation from another entity or operation, and do not require or imply that any such relationship or sequence actually exists between these entities or operations. Moreover, the terms "comprise", "include" or any other variant thereof is intended to be non-exclusive, and therefore a process, method, article or device comprising a series of elements include not only the elements, but also other elements that are not listed explicitly or the elements inherent in the process, method, article or device. Unless more limitations are stated, an element defined by a statement "comprising a" does not exclude that other same elements further exist in a process, method, article, or device comprising this element. In this specification, an action performed according to a certain element means that the action is performed according to at least the element. This includes two cases: the action is performed according to only the element, and the action is performed according to the element and other elements. Expressions such as a plurality of, multiple times, multiple types include two or more, two or more times, and two or more types.

All documents mentioned in the specification are considered as being integrally included in the disclosed content of the specification, and may be used as a basis for modification when necessary. The above-described embodiments are only preferred embodiments of the specification and are not intended to limit the protection scope of the specification. Any modifications, equivalent substitutions, or improvements and the like within the spirit and principles of one or more embodiments of the specification shall fall within the protection scope of the one or more embodiments of the specification.

The specific embodiments of the specification are described above. Other embodiments are within the scope of the attached claims. In some cases, actions or steps in the claims may be performed in a sequence different from that in the embodiments and the desired result can still be achieved. In addition, the desired result can still be achieved if the processes described in the drawings are not necessarily performed in the illustrated particular or continuous sequence. In some implementations, multitasking and parallel processing are also feasible or may be advantageous.

The invention claimed is:

1. A method for on-shelf merchandise detection, comprising:
    obtaining a plurality of depth images associated with a shelf from a first camera, wherein the shelf comprises a plurality of tiers;
    obtaining a plurality of images from one or more second cameras associated with each of the plurality of tiers of the shelf, each of the plurality of tiers of the shelf holding merchandise, and the one or more second cameras associated with each of the plurality of tiers being disposed on each of the plurality of tiers;
    detecting, based on one or more of the plurality of depth images, motions of a user's hand reaching into and moving away from the shelf;
    determining, based on the one or more of the plurality of depth images and in response to detecting the motions of the user's hand reaching into and moving away from the shelf, a tier of the plurality of tiers of the shelf associated with the detected motions, a first point in time associated with the motion of the user's hand reaching into the shelf, and a second point in time associated with the motion of the user's hand moving away from the shelf;
    in response to determining the tier of the shelf associated with the detected motions, identifying, from images obtained from one or more second cameras associated with the determined tier, one or more first images captured before the first point in time and one or more second images captured after the second point in time; and
    determining one or more changes to merchandise on the determined tier of the shelf associated with the detected motions by comparing the one or more first images with the one or more second images.

2. The method of claim 1, wherein the one or more changes to the merchandise on the determined tier of the shelf comprises:
    a change in quantity of a type of the merchandise on the determined tier.

3. The method of claim 1, wherein the one or more second cameras comprise:
    one or more wide-angle cameras; or
    one or more fisheye cameras.

4. The method of claim 1,
    wherein the one or more second cameras associated with each of the plurality of tiers of the shelf comprise at least two cameras, and
    wherein the obtaining a plurality of images from one or more second cameras associated with each of the plurality of tiers of the shelf comprises:
        receiving a plurality of images from each of the at least two cameras; and
        combining the received plurality of images from each of the at least two cameras to obtain a plurality of images that cover positions of all merchandise on each of the plurality of tiers.

5. The method of claim 1, further comprising, before the detecting motions of a user's hand reaching into and moving away from the shelf:
    associating each pixel of the plurality of depth images with one of the plurality of tiers of the shelf.

6. The method of claim 1, wherein the determining one or more changes to merchandise on the determined tier of the shelf associated with the detected motions by comparing the one or more first images with the one or more second images comprises:
    determining a first merchandise information set based on the one or more first images;
    determining a second merchandise information set based on the one or more second images; and
    determining the one or more changes to the merchandise on the determined tier of the shelf based on a difference between the first merchandise information set and the second merchandise information set.

7. The method of claim 1,
    wherein the obtained plurality of depth images comprise a third image showing the user's hand and captured after the second point in time, and
    wherein the method further comprises:
        identifying merchandise in the user's hand based on the third image; and
        determining whether the identified merchandise is consistent with the determined one or more changes to the merchandise on the determined tier of the shelf.

8. A system for on-shelf merchandise detection, comprising a processor and a non-transitory computer-readable storage medium storing instructions executable by the processor to cause the system to perform operations comprising:
    obtaining a plurality of depth images associated with a shelf from a first camera, wherein the shelf comprises a plurality of tiers;
    obtaining a plurality of images from one or more second cameras associated with each of the plurality of tiers of the shelf, each of the plurality of tiers of the shelf holding merchandise, and the one or more second cameras associated with each of the plurality of tiers being disposed on each of the plurality of tiers;
    detecting, based on one or more of the plurality of depth images, motions of a user's hand reaching into and moving away from the shelf;
    determining, based on the one or more of the plurality of depth images and in response to detecting the motions of the user's hand reaching into and moving away from the shelf, a tier of the plurality of tiers of the shelf associated with the detected motions, a first point in time associated with the motion of the user's hand reaching into the shelf, and a second point in time associated with the motion of the user's hand moving away from the shelf;
    in response to determining the tier of the shelf associated with the detected motions, identifying, from images obtained from one or more second cameras associated with the determined tier, one or more first images captured before the first point in time and one or more second images captured after the second point in time; and determining one or more changes to merchandise on the determined tier of the shelf associated with the detected motions by comparing the one or more first images with the one or more second images.

9. The system of claim 8, wherein the one or more changes to the merchandise on the determined tier of the shelf comprises:
   a change in quantity of a type of the merchandise on the determined tier.

10. The system of claim 8, wherein the one or more second cameras comprise:
    one or more wide-angle cameras; or
    one or more fisheye cameras.

11. The system of claim 8,
    wherein the one or more second cameras associated with each of the plurality of tiers of the shelf comprise at least two cameras, and
    wherein the obtaining a plurality of images from one or more second cameras associated with each of the plurality of tiers of the shelf comprises:
    receiving a plurality of images from each of the at least two cameras; and
    combining the received plurality of images from each of the at least two cameras to obtain a plurality of images that cover positions of all merchandise on each of the plurality of tiers.

12. The system of claim 8, wherein the operations further comprise, before the detecting motions of a user's hand reaching into and moving away from the shelf:
    associating each pixel of the plurality of depth images with one of the plurality of tiers of the shelf.

13. The system of claim 8, wherein the determining one or more changes to merchandise on the determined tier of the shelf associated with the detected motions by comparing the one or more first images with the one or more second images comprises:
    determining a first merchandise information set based on the one or more first images;
    determining a second merchandise information set based on the one or more second images; and
    determining the one or more changes to the merchandise on the determined tier of the shelf based on a difference between the first merchandise information set and the second merchandise information set.

14. The system of claim 8,
    wherein the obtained plurality of depth images comprise a third image showing the user's hand and captured after the second point in time, and
    wherein the operations further comprise:
    identifying merchandise in the user's hand based on the third image; and
    determining whether the identified merchandise is consistent with the determined one or more changes to the merchandise on the determined tier of the shelf.

15. A non-transitory computer-readable storage medium for on-shelf merchandise detection, configured with instructions executable by one or more processors to cause the one or more processors to perform operations comprising:
    obtaining a plurality of depth images associated with a shelf from a first camera, wherein the shelf comprises a plurality of tiers;
    obtaining a plurality of images from one or more second cameras associated with each of the plurality of tiers of the shelf, each of the plurality of tiers of the shelf holding merchandise, and the one or more second cameras associated with each of the plurality of tiers being disposed on each of the plurality of tiers;
    detecting, based on one or more of the plurality of depth images, motions of a user's hand reaching into and moving away from the shelf;
    determining, based on the one or more of the plurality of depth images and in response to detecting the motions of the user's hand reaching into and moving away from the shelf, a tier of the tiers of the shelf associated with the detected motions, a first point in time associated with the motion of the user's hand reaching into the shelf, and a second point in time associated with the motion of the user's hand moving away from the shelf;
    in response to determining the tier of the shelf associated with the detected motions, identifying, from images obtained from one or more second cameras associated with the determined tier, one or more first images captured before the first point in time and one or more second images captured after the second point in time; and
    determining one or more changes to merchandise on the determined tier of the shelf associated with the detected motions by comparing the one or more first images with the one or more second images.

16. The non-transitory computer-readable storage medium of claim 15, wherein the one or more changes to the merchandise on the determined tier of the shelf comprises:
    a change in quantity of a type of the merchandise on the determined tier.

17. The non-transitory computer-readable storage medium of claim 15, wherein the one or more second cameras comprise:
    one or more wide-angle cameras; or
    one or more fisheye cameras.

18. The non-transitory computer-readable storage medium of claim 15,
    wherein the one or more second cameras associated with each of the plurality of tiers of the shelf comprise at least two cameras, and
    wherein the obtaining a plurality of images from one or more second cameras associated with each of the plurality of tiers of the shelf comprises:
    receiving a plurality of images from each of the at least two cameras; and
    combining the received plurality of images from each of the at least two cameras to obtain a plurality of images that cover positions of all merchandise on each of the plurality of tiers.

19. The non-transitory computer-readable storage medium of claim 15, wherein the operations further comprise, before the detecting motions of a user's hand reaching into and moving away from the shelf:
    associating each pixel of the plurality of depth images with one of the plurality of tiers of the shelf.

20. The non-transitory computer-readable storage medium of claim 15, wherein the determining one or more changes to merchandise on the determined tier of the shelf associated with the detected motions by comparing the one or more first images with the one or more second images comprises:
    determining a first merchandise information set based on the one or more first images;
    determining a second merchandise information set based on the one or more second images; and
    determining the one or more changes to the merchandise on the determined tier of the shelf based on a difference between the first merchandise information set and the second merchandise information set.

\* \* \* \* \*